UNITED STATES PATENT OFFICE.

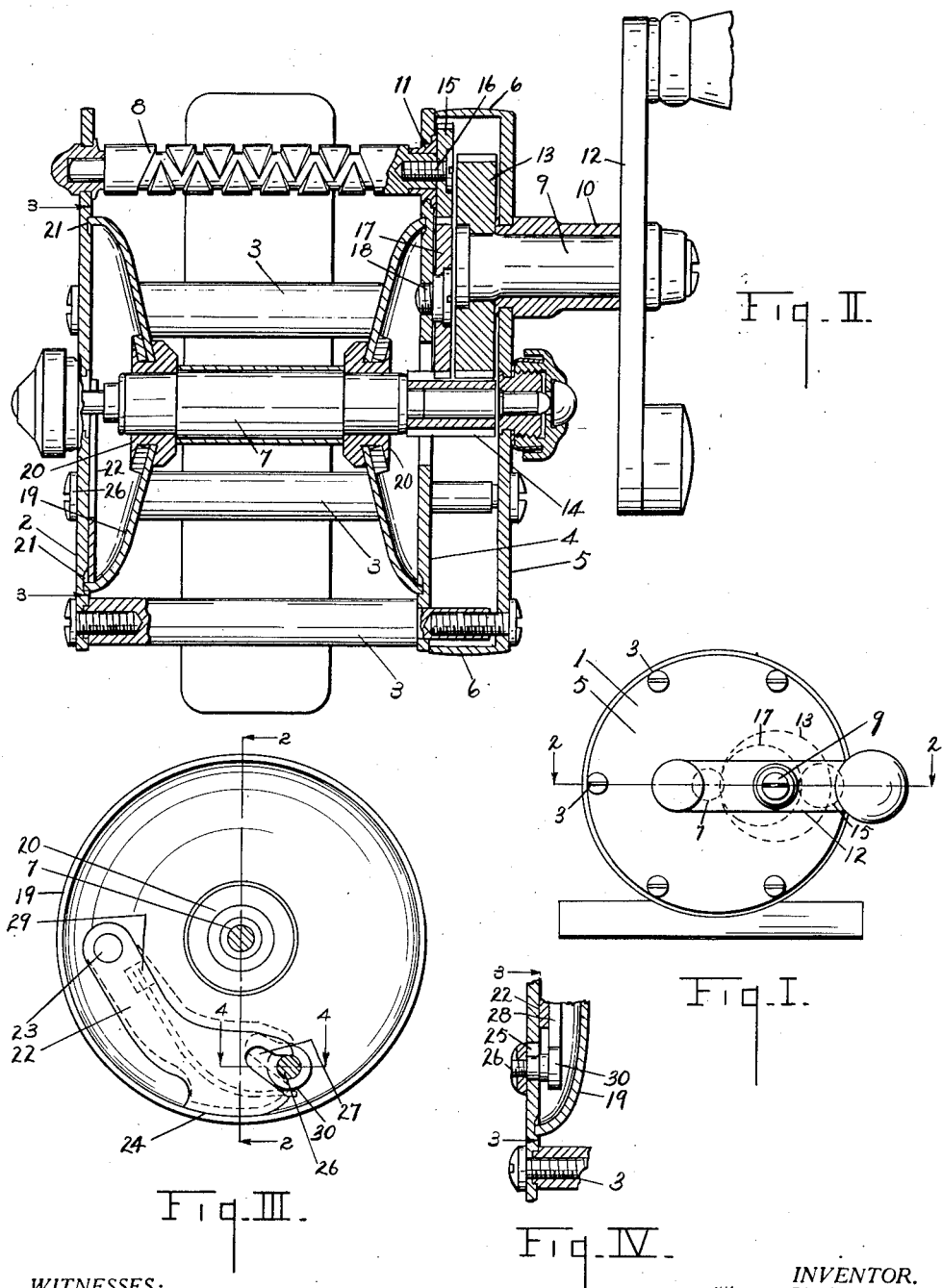

WILLIAM SHAKESPEARE, JR., AND WILLIAM SCHMID, OF KALAMAZOO, MICHIGAN, ASSIGNORS TO SHAKESPEARE COMPANY, OF KALAMAZOO, MICHIGAN.

FISHLINE-REEL.

1,330,553. Specification of Letters Patent. Patented Feb. 10, 1920.

Application filed April 8, 1919. Serial No. 288,628.

*To all whom it may concern:*

Be it known that we, WILLIAM SHAKESPEARE, Jr., and WILLIAM SCHMID, citizens of the United States, residing at the city and county of Kalamazoo, State of Michigan, have invented certain new and useful Improvements in Fishline-Reels, of which the following is a specification.

This invention relates to improvements in fish line reels.

The main objects of this invention are:

First, to provide in a fish line reel an improved level winding mechanism which is very compact and simple in structure and may be embodied in a structure without materially increasing the diameter of the frame and still provide a spool of large capacity.

Second, to provide an improved fish line reel having these advantages which is very simple and economical in its parts and one in which the parts are easily assembled or disassembled should occasion require.

Third, to provide in an improved fish line reel an improved brake device.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Figure I is an end view of our improved fishing reel, the position of the spool and level winding shaft being indicated by dotted lines.

Fig. II is a detail view mainly in longitudinal section on line corresponding to line 2—2 of Figs. I and III.

Fig. III is a detail section on a line corresponding to line 3—3 of Figs. II and IV.

Fig. IV is an enlarged detail through the brake mechanism on a line corresponding to line 4—4 of Fig. III.

In the drawing similar reference characters refer to similar parts throughout the several views and the sectional views are taken looking in the direction of the little arrows at the ends of the section lines.

Referring to the drawing, the frame of our improved reel comprises a chambered cylindrical head designated generally by the numeral 1 and cylindrical tail plate 2, connected by pillars 3. The chambered head comprises an inner head plate 4 and an outer head plate 5, the outer head plate having a peripheral flange 6. These head plates are arranged upon and secured to the end of the pillars as shown in Fig. II.

The spool shaft 7 is disposed centrally of the frame and extends through the chambered head. At one side of the spool and adjacent the periphery frame is a reversely threaded traversing screw 8. The balance of the level winding mechanism is not shown as it forms no part of our present invention. The bearing 11 for the winding screw 8 is carried by the inner head plate 4.

The driving shaft 9 is mounted in a bearing 10 projecting outwardly from the outer head plate. This driving shaft 9 is preferably disposed in the plane of the shaft 7 and screw 8.

The driving shaft 9 is provided with a counter-balanced crank 12. The driving gear 13 is arranged within the chambered head and in a spaced relation to the inner head plate as shown in Fig. II. This gear 13 meshes with the pinion 14 on the spool shaft. A pinion 15 is secured to the inner end of the traversing screw by means of the screw 16 so that the pinion 15 lies between the inner head plate at the end of the shaft 8 and the driving gear 13.

A gear 17 connects the pinion 15 to the gear 14 on the spool shaft, the gear 17 lying between the inner head plate and the driving gear 13. The gear 17 is carried by a stub shaft 18 mounted on the inner head plate.

With this arrangement we secure a reduced speed drive for the traversing screw 8, that is, it is driven at a slow speed relative to the spool and the gears are so arranged that the dimensions of the reel do not materially exceed the dimensions of reels as commonly built without the level winding features.

The spool flanges 19 are provided with hub portions 20 secured to the spool shaft. These spool flanges are flared outwardly and their peripheries travel in annular grooves 21 formed in the end plate 2 and the inner head plate 4.

The brake 22 is pivoted on the end plate 2 at 23 to swing laterally of the spool shaft.

The brake has a shoe 24 adapted to coact internally with the rim portion of the adjacent spool flange.

The end plate has a slot 25 therein through which the fingerpiece 26 is disposed to engage a cam slot 27 in the brake.

A spring 28 is secured to the brake at 29 with its free end riding on the portion 30 of the fingerpiece.

When released the brake is urged outwardly by the spring. This brake mechanism has the advantage of simplicity in structure and compactness.

We have illustrated and described our improvements in an embodiment which we find very practical. We have not attempted to illustrate or describe certain modifications in structural details which we contemplate as we believe the disclosure made will enable those skilled in the art to which our invention relates to embody or adapt the same as may be desired.

Having thus described our invention, what we claim as new and desire to secure by Letters Patent, is:

1. In a fishing reel, the combination with a chambered head comprising inner and outer head plates, a spool shaft disposed centrally of said head, a reversely threaded traversing screw, a bearing for said traversing screw mounted on the inner head plate adjacent the periphery thereof, a driving crank shaft disposed in the plane of said spool and traversing screw, a bearing for said driving shaft mounted on the outer head plate and projecting outwardly therefrom, a driving gear on said driving shaft disposed within said head in a spaced relation to the inner head plate, a pinion on said spool shaft meshing with said driving gear, a pinion secured on the inner end of said traversing screw and lying between the inner head plate and said driving gear, a connecting gear for said traversing screw and spool pinions disposed between said driving gear and the inner head plate, and a stub shaft therefor mounted on the inner head plate.

2. In a fishing reel, the combination with a chambered head comprising inner and outer head plates, a spool shaft disposed centrally of said head, a reversely threaded traversing screw, a bearing for said traversing screw mounted on the inner head plate adjacent the periphery thereof, a driving gear disposed within said head in a spaced relation to the inner head plate, a pinion on said spool shaft meshing with said driving gear, a pinion secured on the inner end of said traversing screw and lying between the inner head plate and said driving gear, a connecting gear for said traversing screw and spool pinions disposed between said driving gear and the inner head plate, and a stub shaft therefor mounted on the inner head plate.

3. In a fishing reel, the combination with a chambered head comprising inner and outer head plates, a spool shaft, a reversely threaded traversing screw provided with a bearing on the inner head plate, a driving crank shaft, a bearing for said driving shaft mounted on the outer head plate, a driving gear on said driving shaft disposed within said head in a spaced relation to the inner head plate, a pinion on said spool shaft meshing with said driving gear, a pinion on the inner end of said traversing screw and lying between the inner head plate and said driving gear, a connecting gear for said traversing screw and spool pinions disposed between said driving gear and the inner head plate, and a stub shaft therefor mounted on the inner head plate.

4. In a fishing reel, the combination with a chambered head comprising inner and outer head plates, a spool shaft, a reversely threaded traversing screw provided with a bearing on the inner head plate, a driving gear disposed within said head in a spaced relation to the inner head plate, a pinion on said spool shaft meshing with said driving gear, a pinion on the inner end of said traversing screw and lying between the inner head plate and said driving gear, a connecting gear for said traversing screw and spool pinions disposed between said driving gear and the inner head plate, and a stub shaft therefor mounted on the inner head plate.

In witness whereof we have hereunto set our hands and seals in the presence of two witnesses.

WILLIAM SHAKESPEARE, Jr. [L. S.]
  WILLIAM SCHMID. [L. S.]

Witnesses:
  LUELLA G. GREENFIELD,
  MARGARET L. GLASGOW.